United States Patent
Staal

[19]

[11] Patent Number: 6,138,794
[45] Date of Patent: *Oct. 31, 2000

[54] PORTABLE SELF-ADJUSTING LADDER

[75] Inventor: Brian Staal, Combermere, Canada

[73] Assignee: Transafety Inc., Combermere, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/931,538

[22] Filed: Sep. 16, 1997

[51] Int. Cl.[7] ..................................................... E06C 1/36
[52] U.S. Cl. .............................. 182/206; 182/23; 182/24; 182/95
[58] Field of Search ................................... 182/23, 24, 93, 182/95, 96, 97, 127, 156, 157, 159, 160, 161, 162, 163, 194, 206, 209

[56] References Cited

U.S. PATENT DOCUMENTS

| | | | |
|---|---|---|---|
| D. 359,134 | 6/1995 | Toews | D25/64 |
| 646,347 | 3/1900 | Betty | 182/24 |
| 665,238 | 1/1901 | Libby | 182/23 X |
| 858,839 | 7/1907 | Upton | 182/206 |
| 1,018,877 | 2/1912 | Chickering | 182/206 |
| 1,894,489 | 1/1933 | Hirose et al. | 182/23 |
| 2,299,584 | 10/1942 | Low | 182/24 |
| 2,318,943 | 5/1943 | Holmes | 182/206 |
| 2,896,830 | 7/1959 | Bair | 182/209 |
| 3,042,143 | 7/1962 | Silen | 182/206 |
| 3,590,952 | 7/1971 | Thomas | 182/206 |
| 3,858,683 | 1/1975 | Rachocki | 182/206 X |
| 3,882,965 | 5/1975 | Loomis et al. | 182/193 |
| 4,089,390 | 5/1978 | McLain | 182/206 |
| 4,161,997 | 7/1979 | Norman | 182/93 |
| 4,280,590 | 7/1981 | Polizzi | 182/214 |
| 4,311,209 | 1/1982 | Primerano et al. | 182/206 |
| 4,311,210 | 1/1982 | Jackson | 182/214 |
| 4,371,055 | 2/1983 | Ashton et al. | 182/194 X |
| 4,549,632 | 10/1985 | Inoue | 182/160 X |
| 4,699,246 | 10/1987 | Wang | 182/24 |
| 4,815,564 | 3/1989 | Yoo | 182/160 |
| 4,844,207 | 7/1989 | Andrews et al. | 182/206 X |
| 4,880,200 | 11/1989 | Champagne et al. | 182/206 X |
| 4,907,674 | 3/1990 | Miller | 182/206 X |
| 4,974,701 | 12/1990 | Parise | 182/194 |
| 5,024,292 | 6/1991 | Gilbreath et al. | 182/90 |

*Primary Examiner*—Daniel P. Stodola
*Assistant Examiner*—Bruce A. Lev

[57] ABSTRACT

A portable ladder having stabilizer brackets slidably mounted on the ladder siderails to permit the ladder to be mounted to a flatbed trailer tiedown rail. The slidable stabilizer brackets are substantially self-adjusting in position, and adjust automatically, for example, when a load is removed from the trailer. The ladder may optionally include two sections pivotably interconnected to facilitate handling and storage. A lock to secure the two sections together in an extended position may also be provided. The advantage is a lightweight, portable ladder which can be used with practically any flatbed trailer. The ladder adjusts substantially automatically to the height of the trailer to provide stable access to the trailer bed.

15 Claims, 3 Drawing Sheets

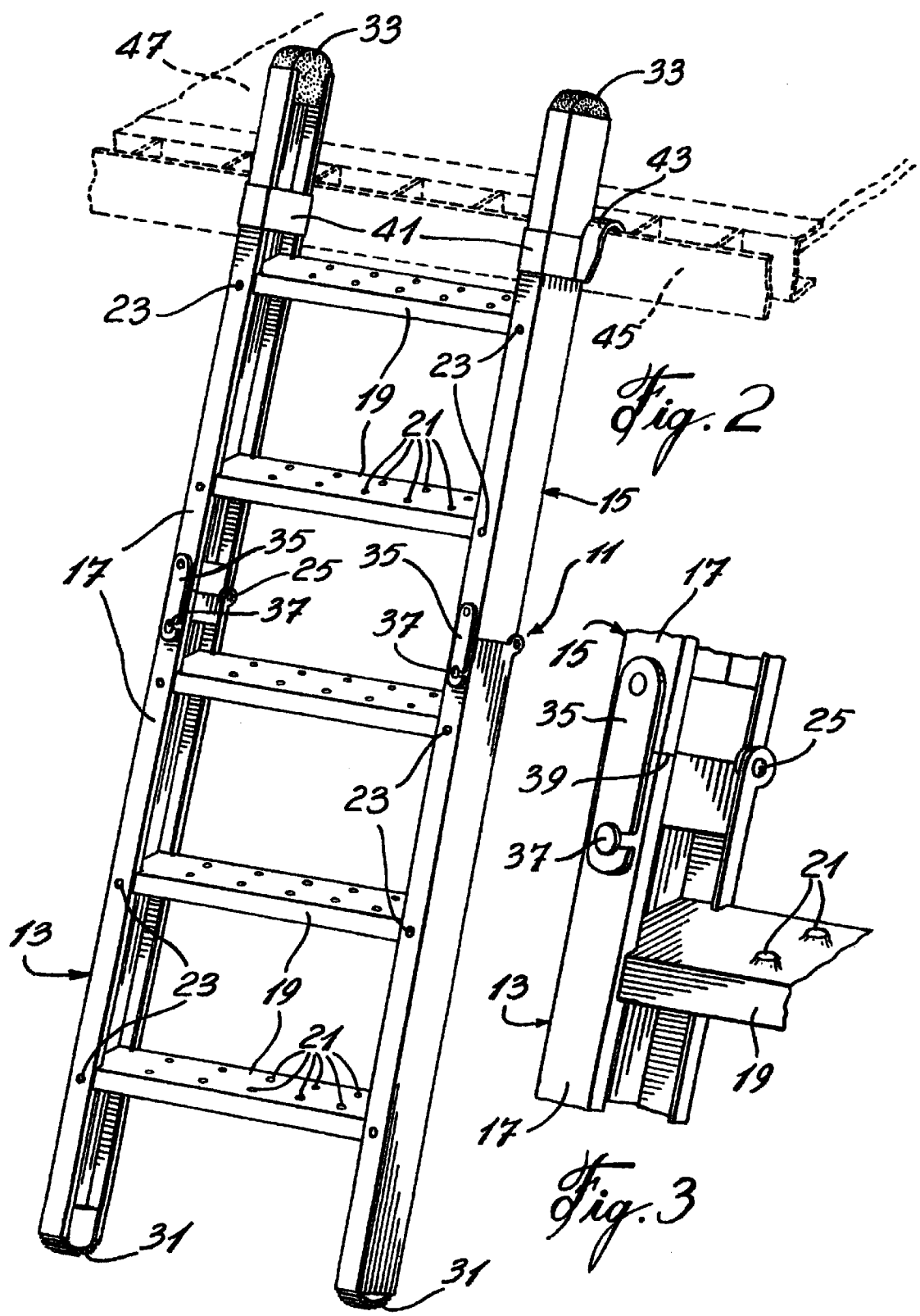

PORTABLE SELF-ADJUSTING LADDER

BACKGROUND OF THE INVENTION (a) Field of the Invention

The invention relates to ladders and, in particular to a portable, self-adjusting ladder for accessing a flatbed trailer, especially a flatbed trailer for a semi truck.

(b) Description of Prior Art

Flatbed trailers are widely used for transporting machinery, equipment, large articles, and articles in containers. Access to the flatbed is frequently required during loading, unloading and for load inspection or the like. Flatbed trailers are, however, too high for easy access. The average flatbed trailer is about 44–52 inches high, which makes access to the trailer difficult and potentially dangerous. Consequently, ladders have been utilized to permit easy access to a flatbed trailer. Several types and styles of ladder have been designed for use with flatbed trailers. U.S. Pat. No. 5,024,292, which issued Jan. 18, 1991 to Gilbreath et al, and U.S. Pat. No. 3,882,965, which issued May 13, 1975 to Loomis et al, are exemplary of these. Truck ladders that are adjustable in length have also been invented and described in U.S. Pat. No. 4,161,997, which issued Jul. 24, 1979 to Norman, and U.S. Pat. No. Design 359,134, which issued Jun. 6, 1995 to Toews.

Attachments for securing a ladder leaned against a roof or a wall of a building are also described in U.S. Pat. No. 4,311,210, which issued Jan. 9, 1982 to Jackson, and U.S. Pat. No. 4,280,590, which issued Jul. 28, 1991 to Polizzi.

Most of the truck ladders described in the prior art are mounted to the truck or flatbed trailer. While this provides convenient availability, it has several disadvantages. For example, ladders mounted to the trailer are exposed to heavy vibration, corrosive road salts and spray which contribute to wear. Such ladders also generate considerable noise when the trailer is hauled over rough roads. In addition, many truck drivers do not haul the same trailer for an extended period of time. Since a trailer-mounted ladder is not easily moved from one trailer to another, drivers cannot be assured that they will have a ladder with their next load. It is therefore desirable to provide a flatbed ladder which is portable so that it can travel with a driver rather than a specific flatbed trailer. Another disadvantage of the trailer-mounted ladders is their fixed position on the trailer. Certain loads may block access to the trailer simply because they present an obstacle at the location on the trailer where the ladder is mounted.

Another common problem with flatbed trailers is that they are variable in height, because the height of the trailer changes within a limited range when loads are applied or removed. It is therefore desirable to provide a ladder which can be readily adjusted to permit safe access to a trailer, regardless of the load on the trailer.

SUMMARY OF THE INVENTION

It is an object of the present invention to provide a ladder which is portable and includes stabilizer brackets that are substantially self-adjusting.

It is a further object of the invention to provide a portable ladder that is suitable for use with a flatbed trailer.

It is yet a further object of the invention to provide a portable ladder that may be folded to facilitate handling and storage.

In accordance with the present invention there is provided a ladder comprising:

opposed siderails with treads which interconnect the siderails to provide a stable structure, and;

stabilizer brackets slidably mounted to the opposed siderails, the stabilizer brackets including means for engaging a horizontal rail so that the ladder is inhibited from tipping to one side, the stabilizer brackets being substantially immobilized on the siderails when the weight of a user of the ladder is applied to at least one of the treads.

The ladder in accordance with the invention is particularly suited for use with flatbed trailers having a tiedown rail that extends along a side of the trailer. To facilitate portability, the ladder may include hingedly connected upper and lower ladder sections that may be folded together for ease of handling and storage.

BRIEF DESCRIPTION OF THE DRAWINGS

Having thus generally described the nature of the invention, reference will now be made to the accompanying drawings, showing by way of illustration a preferred embodiment thereof, and wherein:

FIG. 2 is a perspective view similar to the one of FIG. 1 wherein the flatbed ladder is extended; and FIG. 3 is a fragmentary perspective view of the flatbed ladder of FIG. 2.

DETAILED DESCRIPTION OF THE PREFERRED EMBODIMENT

Figure 1:
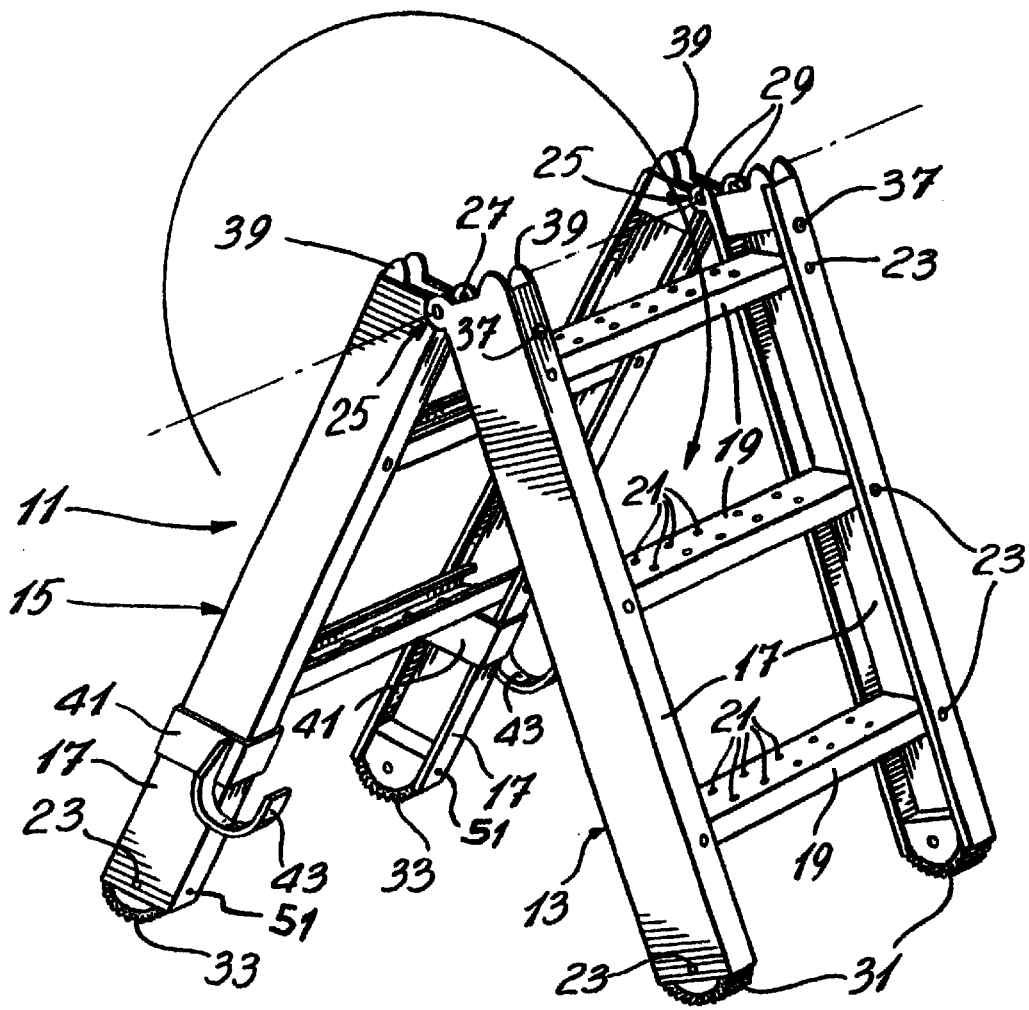
FIG. 1 is a perspective view of a partially folded flatbed ladder in accordance with one embodiment of the present invention.
Figure 1A:
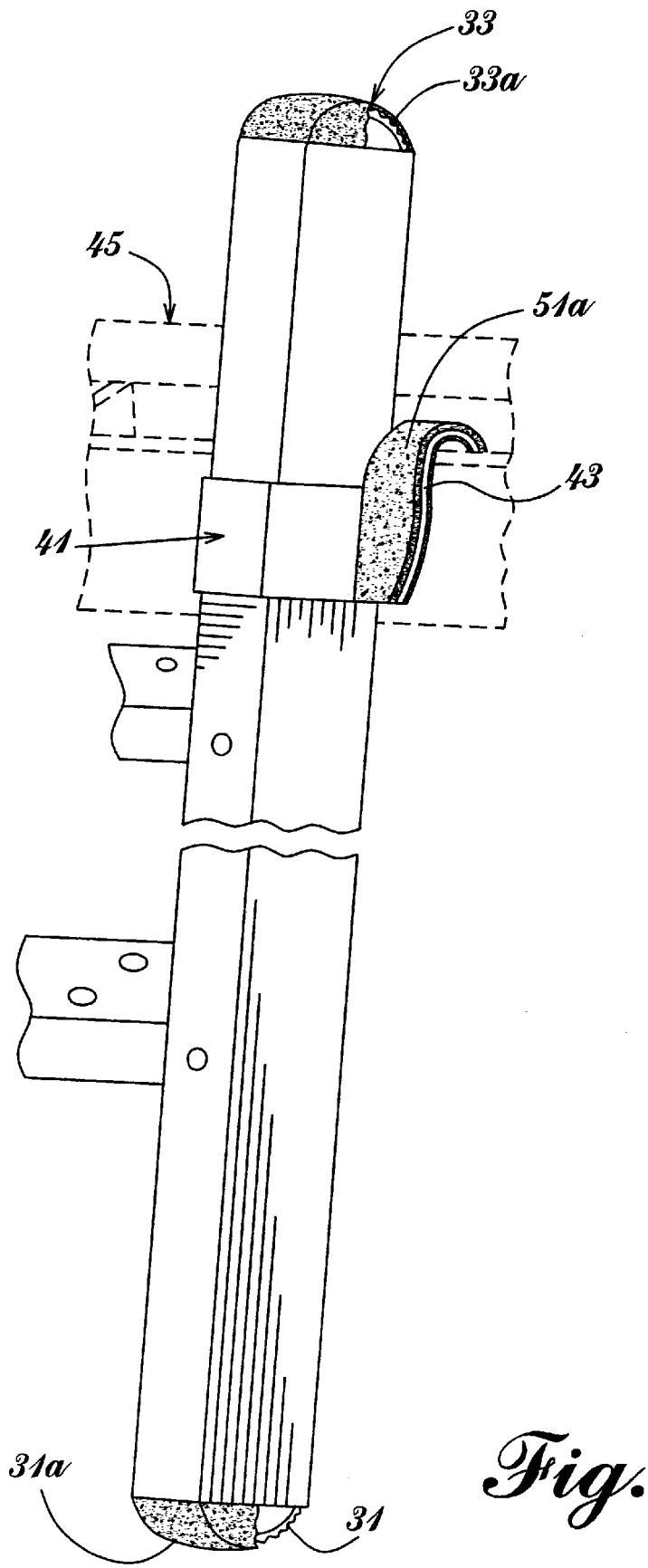

In accordance with the present invention, there is provided a portable and self-adjusting ladder. FIG. 1 of the drawings shows a ladder 11, in accordance with one embodiment of the invention which includes lower and upper ladder sections 13, 15 having aluminum channel siderails 17 and treads 19 which are preferably mortised and riveted to the ladder siderails 17 so that they cannot slip down the ladder siderails 17. The treads 19 as illustrated in FIG. 1 have holes or slots 21 that are die punched upwardly to provide an embossed surface for better footing when using the ladder 11. Each tread 19 is riveted to the siderails 17 with rivets 23 (FIG. 3), as described above. The lower and upper ladder sections 13, 15 are connected together with die cast aluminum hinges 25 which pivot around a bolt 29 secured by a nut 27. The hinges 25 are preferably riveted to the ladder siderails 17.

The lower ladder section 13 is provided on its lower end with ribbed feet 31 coated with a soft, high-friction material such as a rubber, to provide a secure grip on most surfaces. The ribbed feet 31 are riveted to the siderails 17 of the ladder 11. In a similar manner, the top end of the upper ladder section 15 is provided with soft, high-friction top caps 33 at top of each siderail 17 to provide a comfortable grip and prevent injury. The top caps 33 are also riveted to the siderail 17.

As apparent from FIGS. 1 and 2, straps 35, preferably made of steel spring, are mounted on one of the lower or upper ladder sections 13, 15 so that they each engage a bolt 37 mounted on the other one of the lower or upper ladder sections 13, 15 when the ladder 11 is unfolded in order to secure the ladder 11 in an unfolded position. Abutment surfaces 39 (see FIG. 3) are also provided in the preferred embodiment illustrated in FIGS. 1 to 3 to align the siderails 17 of the lower and upper ladder sections 13, 15 together when the flatbed ladder 11 is unfolded.

As shown in FIGS. 1 and 2, a stabilizer bracket 41 is slidably mounted on each siderail 23 of the upper ladder portion 15. Each stabilizer bracket 41 includes a hook 43 to mount the ladder 11 to a tiedown rail 45 of a flatbed trailer 47. The sliding action permits the ladder to be substantially self-adjusting if a load is removed from the flatbed while the ladder 11 is attached and the flatbed rises in response to removal of the load. The hook 43 also facilitates quick attachment of the ladder 11 to flatbeds of slightly varying height. Accordingly, the stabilizer brackets 41 are designed to slide along the siderail 17 of the ladder 11 to provide for height adjustment. The height of different trailers varies, as does the height of any specific trailer depending on whether the trailer is loaded or not. Therefore, the stabilizer brackets 41 slide along the siderail 17 of the ladder 11 to self-adjust to the height of a flatbed, while the latter feet 31 remains resting on the ground. A stop 51 (see FIG. 1) prevents the stabilizer brackets from sliding off a top end of the siderails 17. The stabilizer brackets 41 can slide freely on the siderails 17 between the stop 51 and a lower limit which may, for example, be defined the top-most tread 19 and/or its associated rivets. While the stabilizer brackets are designed to slide along the siderails 17 with little resistance when the ladder is unloaded, when a user steps on a tread of the ladder, tension on the hook member slightly cants the stabilizer members 41 which causes them to bind on the siderails to prevent the ladder from tipping sideways. When the ladder 11 is installed on a tiedown rail 45, the ladder 11 is preferably inclined with respect to the vertical for ease of climbing. When the person steps on a tread 19 of the ladder 11, the weight of the person is supported by substantially vertical load bearing engagement of the ladder feet 31 on the ground. Due to the inclination of the ladder 11, the weight of the person also creates a horizontal force component which is resisted by substantially horizontal load bearing engagement between the tiedown rail 45 and the stabilizer brackets 41, which in turn applies a pressure to the stabilizer brackets 41. That pressure is applied to the stabilizer brackets 41 such that the stabilizer brackets 41 are canted against the siderail 17, thereby locking the stabilizer brackets 41 on the siderail 17 at a position intermediate the stop 51 and the top-most tread 19 and inhibiting it from sliding up or down. The hooks 43 are also preferably coated with a high-friction durable coating such as a rubber or plastic compound to further inhibit sideways movement of the hooks on a rail to which the ladder is attached.

The ladder 11 of the present invention is preferably of about 60 inches in height so that it projects above a flatbed trailer of about 44–52 inches in height when mounted thereon to provide a user with grips to assist the user in climbing or descending the ladder. However, the ladder 11 may be any convenient height.

The lower and upper ladder sections 13, 15 may be connected together by any connection that permits folding of the ladder 11. Accordingly, the upper and lower sections may be connected with hinges as illustrated in FIGS. 1 to 3. Depending on how the hinges are fixed on the lower and upper sections, it may be necessary to provide either the upper section, the lower section or both with spacers or abutment surfaces to maintain the upper and lower section in a same plane when the ladder is extended. One could also design the lower and upper sections to slide, lengthwise, one along the other and engage in place when fully extended.

The hooks 43 may be replaced by any mechanism for mounting the ladder to a rail such as the tiedown rail of a flatbed trailer. However, an advantage of the hooks 43 is that they readily and securely engage the tiedown rail. Accordingly, the ladder is easily installed and removed from the tiedown rail of the flatbed trailer.

The siderails of the ladder of the present invention are preferably made of aluminum extrusions having inwardly facing flanges. The flanges of the siderails are routed to accommodate the treads so that the treads are supported not only by rivets driven through the siderail flanges but also by the in-turned edges of the siderails. The siderails could also have a different shape or be made of a different material such as tubular aluminum.

The ladder is preferably stored in a storage compartment of a truck tractor when not in use. In use, if the ladder is foldable, it is extended and the stabilizer brackets 41 are slid down the siderails 15 a few inches so that they will self-adjust to an ideal position when the ladder 11 is mounted to the siderail of a flatbed trailer, for example. The hooks 43 are then hooked over the siderail and the ladder is supported at a proper angle until the stabilizer brackets 41 self-adjust and the ladder feet 31 rest on the ground. The ladder 11 may then be immediately mounted because the weight of the user locks the stabilizer brackets to the siderails and the ladder is inhibited from tipping sideways. A significant advantage of the ladder in use is that it may be located at any convenient location on either side of the trailer. Thus, if a load prevents access to a part of the trailer, the ladder may be moved to a location where access is possible. Likewise, if poor ground conditions such as water or mud present an inconvenience, the ladder may be positioned in a more favourable spot. These advantages cannot be realized with a trailer-mounted ladder.

While the invention has been described with particular reference to the illustrated embodiment, it will be understood that numerous modifications may be apparent to those skilled in the art. Accordingly, the above description and accompanying drawings should be taken as illustrative of the invention and not in a limiting sense.

I claim:

1. A ladder comprising:
    a) opposed siderails having a top end and a bottom end, the bottom end being adapted for substantially vertical load-supporting engagement with a base surface,
    b) at least one tread affixed between the opposed siderails and cooperating therewith to provide a stable structure; and
    c) a respective stabilizer bracket slidably mounted about the top end of each siderail and adapted for substantially horizontal load supporting engagement with a rail, each stabilizer bracket comprising a pair of opposed surfaces selectively engageable with corresponding surfaces of a respective siderail, such that each stabilizer bracket is readily slidable between first and second limit positions when the bottom ends of the siderails are resting on the base surface and no load is applied to the ladder, and each stabilizer bracket cants to operably bind on the respective siderail by engagement between the opposed surfaces of the stabilizer bracket and the corresponding surfaces of the siderail to thereby substantially immobilize the stabilizer bracket at a position intermediate the first and second limit positions when the bottom ends of the siderails are resting on the base surface and the weight of a user is applied to a tread.

2. The ladder as claimed in claim 1, wherein the ladder further comprises:
    a) an upper ladder section having opposite siderails connected together by treads, each siderail having first and second ends;

b) a lower ladder section having opposite siderails connected together by treads, each siderail having first and second ends; and c) a connector adapted for connecting the second end of the siderails of the upper ladder section to the first end of the siderails of the lower ladder section.

3. The ladder as claimed in claim 2, wherein the connector comprises a pair of hinges enabling pivotal connection of the upper and lower sections between a folded position and an extended position.

4. The ladder as claimed in claim 3, further comprising a locking mechanism for securing together in an extended position the second end of the siderails of the upper ladder section with the first end of the siderails of the lower ladder section, thereby preventing folding of the ladder.

5. The ladder as claimed in claim 4, wherein said locking mechanism comprises steel spring straps which respectively pivot about a first pin affixed to one ladder section, the spring steel straps including a notch in an opposite end for engaging a second pin affixed to the other ladder section.

6. The ladder as claimed in claim 1, further comprising ribbed feet, coated with a soft, high-friction material connected to the bottom end of the siderails, and top end caps connected to a top end of the siderails, the top end caps likewise being coated with a soft, high-friction material.

7. The ladder as claimed in claim 1, wherein the siderails are made of extruded aluminum.

8. The ladder as claimed in claim 1 wherein each stabilizer bracket includes a respective hook affixed thereto for substantially horizontal load supporting engagement with the rail.

9. The ladder as claimed in claim 8 wherein the hooks are coated with a durable high-friction coating to inhibit movement of the hooks on the rail.

10. The ladder as claimed in 1 wherein the ladder is for use in mounting a flatbed trailer and the rail is a siderail of the flatbed trailer.

11. A self-adjusting flatbed trailer ladder for assembly with a trailer rail of a flatbed trailer, comprising:

a) a pair of opposed ladder siderails and at least one tread connected between the ladder siderails to provide a stable structure, the siderails having a top end and a bottom end, the bottom end being adapted for substantially vertical load supporting engagement with a base surface; and b) a respective stabilizer bracket slidably mounted about each siderail, each stabilizer bracket comprising a pair of opposed surfaces selectively engagable with corresponding surfaces of a respective siderail so that the stabilizer bracket is operable to slide over each siderail between first and second limit positions substantially without resistance when the bottom end of the ladder siderails are resting on the base surface and no load is applied to the ladder; and c) a respective hook affixed to each stabilizer bracket for engaging the trailer rail, the hook being configured to cant the respective stabilizer bracket to bind on the ladder siderail by engagement between the opposed surfaces of the stabilizer bracket and the corresponding surfaces of the ladder siderail, to thereby substantially immobilize the stabilizer bracket at a position intermediate the first and second limit positions when the bottom end of the ladder siderails are resting on the base surface and the weight of a user of the flatbed trailer ladder is applied to at least one of the treads.

12. A self-adjusting flatbed trailer ladder as claimed in claim 11 wherein the ladder includes first and second sections hingedly connected to permit the ladder to be folded to facilitate transport and storage.

13. The self-adjusting flatbed trailer ladder as claimed in claim 12 wherein the ladder further includes means for locking the first and second sections in a folded condition.

14. The self-adjusting flatbed trailer ladder as claimed in claim 11 wherein top and bottom ends of each siderail includes a cap coated with a soft, high-friction material to protect users and resist slippage on a supporting surface.

15. The self-adjusting flatbed trailer ladder as claimed in claim 11 wherein the ladder is of sufficient length to extend above the flatbed on an average trailer to provide a user with grips at a top of the siderails to assist the user in stepping on or off a top of the ladder.

* * * * *